UNITED STATES PATENT OFFICE.

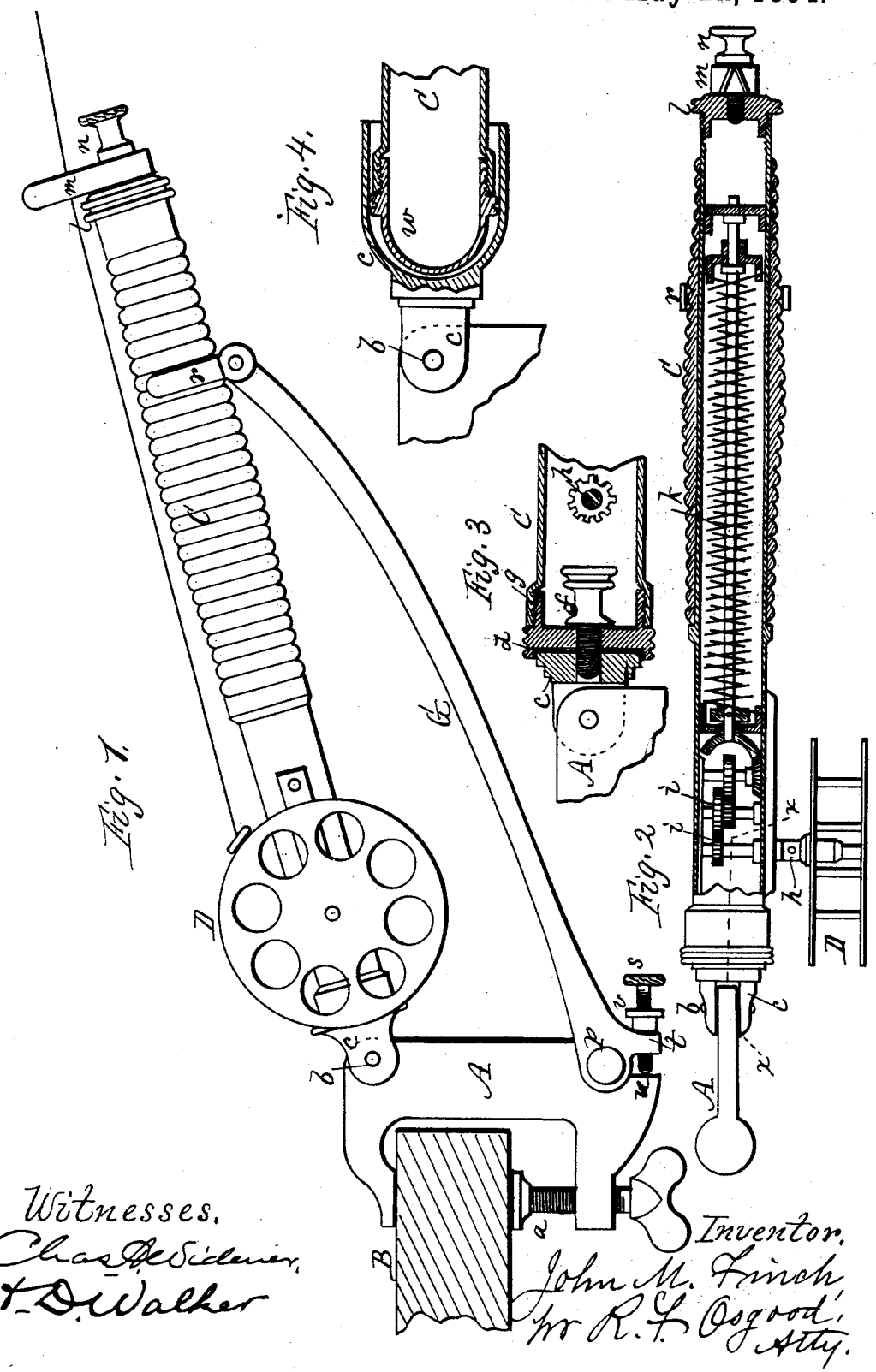

JOHN M. FINCH, OF HORNELLSVILLE, NEW YORK.

FISHING-ROD SUPPORT.

SPECIFICATION forming part of Letters Patent No. 520,041, dated May 22, 1894.

Application filed July 31, 1891. Serial No. 401,263. (No model.)

*To all whom it may concern:*

Be it known that I, JOHN M. FINCH, of Hornellsville, in the county of Steuben and State of New York, have invented a certain new and useful Improvement in Trolling Devices for Fishing; and I do hereby declare that the following is a full, clear, and exact description of the same, reference being had to the drawings accompanying this application.

My improvement relates to that class in which the trolling apparatus is attached to the seat or some other part of the boat, and in which the line is under the control of the operator.

The invention consists in the construction and arrangement of parts hereinafter described and claimed.

In the drawings—Figure 1 is a side elevation of the apparatus attached to the seat of a boat. Fig. 2 is a plan view of the same, a portion being shown in section. Fig. 3 is an enlarged longitudinal, vertical section in line $x\ x$ of Fig. 2. Fig. 4 is a similar sectional view in the same line, showing a modification.

A indicates the clamp, which is of ordinary form, and attached to the seat B, or other part of the boat, by means of a set screw $a$.

C is the butt, pivoted to the clamp at $b$ so as to be turned up or down to different angles. This is to allow the line to pass over the side of the boat without impediment in whatever position the apparatus may be placed. This butt may be the butt of a fishing rod. In order to attach the butt to the clamp the ordinary cap at the end is removed and the form shown in Fig. 3 is used. This device consists of the forked bearing $c$, which is pivoted to the top of the clamp and a loose head $d$, which is attached to the bearing $c$ by means of an interior clamping screw $f$. The end of the butt screws on to a threaded shoulder of the head as shown at $g$. The loose head $d$ is essential to enable the reel which is attached to the butt to be brought to the proper upright position in turning the butt onto the screw threads of the head. It is necessary to so start the threads that, at the end of the turning movement, the reel will stand upright; by the adjustment of the head as described the starting point of the thread can be moved forward or back as may be necessary.

D is the reel. It consists simply of a spool on the outside of the butt, attached to a shaft $h$ that extends to the interior of the butt and is driven by a set of gears $i\ i$ and springs $k\ k$. The line E winds on the reel and passes back over the side of the boat in the usual way. Instead of this interior operating mechanism of the butt an automatic reel of any of the known kinds may be employed. The design is to enable the butt, which forms a detachable part of the first joint of a fishing rod, to be taken off and used as a trolling attachment.

$l$ is a cap which screws into the open outer end of the butt when the latter is removed from the rod.

$m$ is a forked bar forming a line-clamp, which is attached to the cap by a set screw $n$. The line E passes through the open top of the clamp and is held fast by it. When a fish bites the line is raised out of the clamp by hand, and then is subject to the spring action of the reel, which holds steady tension, whether the fish runs forward or back. Preferably the open sides of the clamp are of V form in cross section, as shown, which causes the outer sides to hold the line fast, while the spread of the inner sides allows the line proper play.

G is a brace-arm pivoted at $p$ to the bottom of the clamp A, so as to turn up and down, and provided at its outer end with a concave support or rest $r$, which embraces the butt and sustains the same at any angle at which it may be set. The brace is held at any adjustment by means of a set screw $s$, which passes through an offset $t$, and bears against a shoulder $u$, of the clamp. The screw is held by a jam nut $v$ thereon, which bears against the offset. If desired the support $r$ may have a strap which buckles over or around the butt.

Fig. 4 shows the bearing $c$ in the form of an open-ended socket, in which the end of the butt is placed loosely; this form being adapted to trolling with a rod, the rod resting crosswise of the boat, as is frequently done. In such case the outer end of the butt rests in the support $r$, as before described, and the base of the butt has the usual closed cap $w$.

Having described my invention, I do not claim, broadly, a fishing rod support; but

What I claim as new, and desire to secure bp Letters Patent, is—

1. The combination of the clamp, the socket at the top of the clamp for receiving the butt of the rod, and the arm pivotally attached to the clamp and extended forward to support the rod, as described.

2. The combination of the clamp, the socket at the top of the clamp for receiving the butt of the rod, and an arm pivoted to the clamp provided with means for adjusting it higher or lower, and a bearing at its outer end for receiving and holding the rod, as described.

3. The combination of the clamp, the socket for receiving the rod, consisting of the bearing $c$ the pivoted head $d$ and clamping screw $f$, and the arm G attached at one end to the clamp the other end forming a bearing for the rod, as herein shown and described.

In witness whereof I have hereunto signed my name in the presence of two subscribing witnesses.

JNO. M. FINCH.

Witnesses:
R. F. OSGOOD,
CHAS. A. WIDENER.